United States Patent [19]

Kiunke

[11] 4,305,307
[45] Dec. 15, 1981

[54] ANTI-BACKLASH GEAR DRIVE

[75] Inventor: Paul C. Kiunke, Brea, Calif.

[73] Assignee: The United States of America as represented by the Secretary of the Air Force, Washington, D.C.

[21] Appl. No.: 104,924

[22] Filed: Dec. 18, 1979

[51] Int. Cl.³ .............................................. F16H 55/18
[52] U.S. Cl. ........................................ 74/409; 74/440
[58] Field of Search ................................. 74/409, 440

[56] References Cited

U.S. PATENT DOCUMENTS

| | | | |
|---|---|---|---|
| 1,067,144 | 7/1913 | Schilling | 74/409 |
| 1,796,992 | 3/1931 | Helm et al. | 74/440 |
| 2,397,126 | 3/1946 | Buhrendorf | 74/409 |
| 2,513,217 | 6/1950 | Tomlines | 74/409 |
| 2,663,198 | 12/1953 | Cairnes | 74/409 |
| 2,763,161 | 9/1956 | Bergson | 74/409 |
| 2,765,668 | 10/1956 | Milne | 74/409 |
| 2,900,846 | 8/1959 | Lehman | 74/714 |
| 3,444,760 | 5/1969 | Claxton et al. | 74/640 |
| 3,552,224 | 1/1971 | Dobrauz | 74/405 |
| 3,665,482 | 5/1972 | Cresswell | 342/765 |
| 3,899,933 | 8/1975 | Wright et al. | 74/440 |
| 4,066,356 | 1/1978 | Parker | 355/63 |

Primary Examiner—C. J. Husar
Assistant Examiner—Conrad Berman
Attorney, Agent, or Firm—Donald J. Singer; Jacob N. Erlich

[57] ABSTRACT

In a gear train where there is backlash, the backlash is prevented by a gear drive which includes an anti-backlash driven pinion which is mounted on, or is otherwise connected to, a torsion spring shaft that is adjustable for twisting, and thereby, loading the anti-backlash driven gear.

8 Claims, 1 Drawing Figure

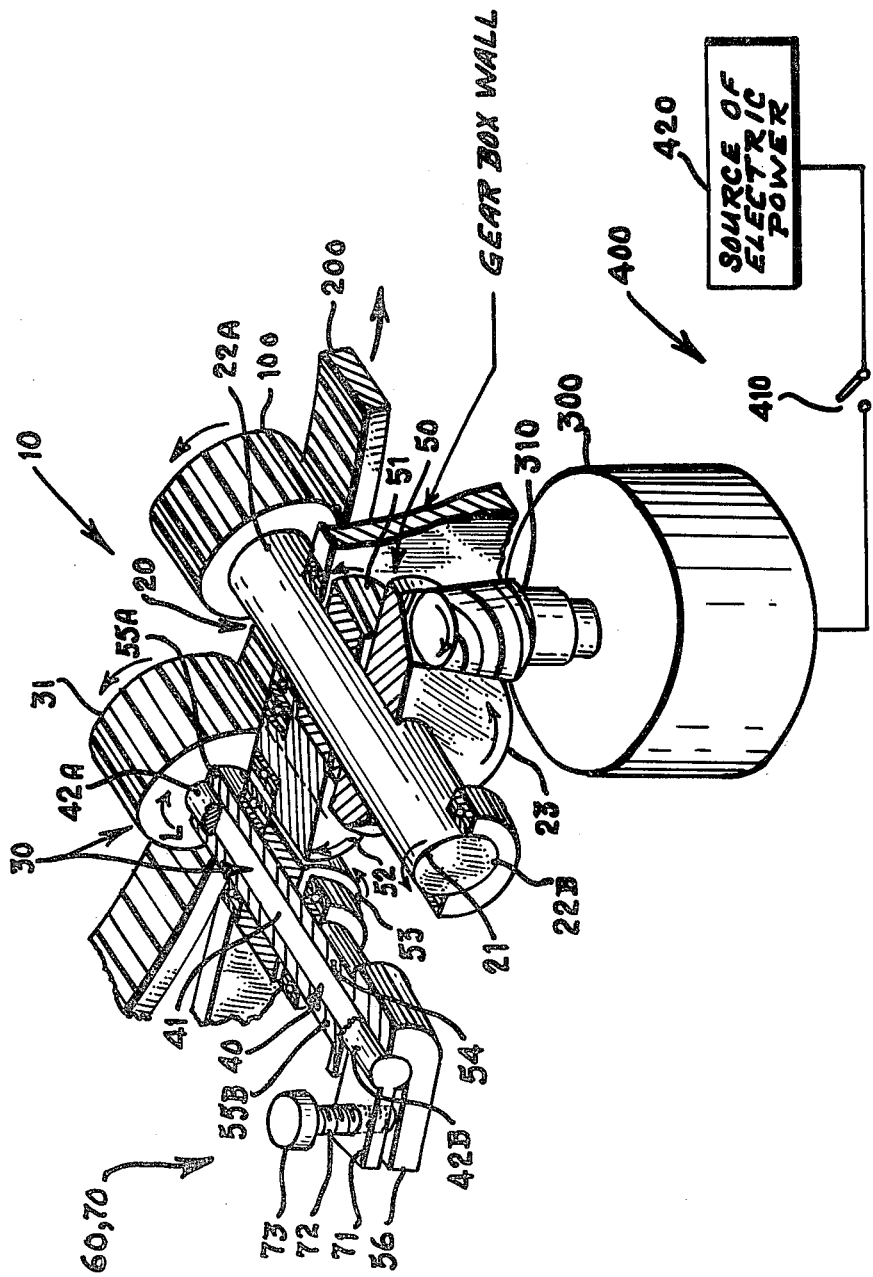

ANTI-BACKLASH GEAR DRIVE

STATEMENT OF GOVERNMENT INTEREST

The invention described herein may be manufactured and used by or for the Government for governmental purposes without the payment of any royalty thereon.

BACKGROUND OF THE INVENTION

This invention relates to an anti-backlash gear drive and, more particularly, to such a gear drive that is adapted for use in controlling backlash effects in a servo driven gear train, as will be shown, described and explained later herein.

In such a gear train, such as is in use in an elevation actuator assembly in a tracking system, the output pinion tends to hunt or rattle during periods of low tracking rates, thereby causing the problems of excessive noise and of needless wear on the gear train.

Where space is not a limiting factor, the prior art provides a solution by the use of split spring-loaded gears, where one gear is staked to the common hub and the other gear is free to rotate but is loaded by springs in one direction, and where the spring force can be varied by winding the split gear to vary the amount of scissors action on the mating gear. However, where space is a limiting factor (e.g., where space limitations do not permit the use of the gear face width that is required), this prior art means for preventing backlash cannot be used.

My invention eliminates these problems (i.e., excessive noise and needless wear on the gear train) even where space is a limiting factor; and, thereby, my invention significantly advances the state-of-the-art.

SUMMARY OF THE INVENTION

This invention pertains to an anti-backlash gear drive that is adapted for use with a gear train which includes a rotatable first driver gear (such as the drive pinion of an elevation actuator assembly in a tracking system), a movable toothed driven member (such as the elevation sector gear of such a tracking system) that is engaged with the first driver gear, and a source of rotary motion driving power (such as an electric drive motor) to which is connected a rotatable second driver gear, where the source of rotary motion driving power can be selectively activated (such as with a switch intermediate the motor and the source of electric power) and, when activated, rotates the second driver gear.

Accordingly, the principal object of this invention is to teach the structure of a preferred embodiment of the aforesaid anti-backlash gear drive, in a form useable for the aforesaid adaptation, whereby the problems of excessive noise and of needless wear on the gear train are eliminated.

This principal object, as well as related objects, of this invention will become readily apparent after a consideration of the description of the invention, together with reference to the drawing.

DESCRIPTION OF THE DRAWING

The drawing is a perspective view, in simplified form, both pictorial and schematic, and partially in cross section and partially fragmented of the preferred embodiment of the invention in its working environment.

DESCRIPTION OF THE PREFERRED EMBODIMENT

With reference to the drawing, therein is shown, in simplified form, the preferred embodiment 10 of my invention, a novel anti-backlash gear drive that is adapted for use in and with a gear train in which there is backlash. As a preliminary matter, and more specifically, it is to be noted and remembered that the invention 10 is adapted for use with a gear train which includes a rotatable first driver gear 100, a movable, toothed driven member 200 that is engaged with the first driver gear 100, and a source of rotary motion driving power 300 (e.g., an electric motor) to which is connected a rotatable second driver gear 310, where the source of rotary motion driving power 300 can be selectively activated by known conventional means 400 (e.g., this means can comprise, if used with electric motor 300, a switch 410 that is disposed intermediate the motor 300 and a source of electric power 420) and, when the source of rotary motion driving power 300 is activated, that power source 300 causes the rotatoion of the second driver gear 310.

In the most basic and generic structural form, the invention 10 comprises: a means (generally designated 20) for interconnecting the rotatable second driver gear 310 to the rotatable first driver gear 100, so that when the second driver gear 310 is rotated by the source of rotary motion driving power 300, then the rotatable first driver gear 100 is rotated in a preselected direction (as is shown by the arrow) and at a preselected speed, with the result that the first driver gear 100 moves the movable, toothed driven member 200, with which the first driver gear 100 is engaged, in the direction shown by the arrow; a means (generally designated 30) for preventing backlash between the rotatable first driver gear 100 and the movable, toothed driven member 200, with which it is engaged, where this means 30 includes a rotatable anti-backlash driven gear 31 that is engaged with the movable, toothed driven member 200, and also includes a means (generally designated 40) for loading the anti-backlash driven gear 31 with a force (generally designated "L" and with an arrow) of preselected magnitude against the movable, toothed driven member 200, with this force-loading means 40 operatively associated with the rotatable anti-backlash driven gear 31; and, a means (generally designated 50) for imparting rotary motion to the force-loaded anti-backlash driven gear 31, with this imparted rotary motion being in the same direction and at the same speed at which the rotatable first driver gear 100 is being driven, and with this rotary motion imparting means 50 operatively associated, as will be described in detail later herein, with the force-loaded anti-backlash driven gear 31.

It is here to be noted that the ratio of the first driver gear 100 to the anti-backlash driven gear 31 is 1-to-1 (i.e., 1:1), and that the direction of rotation of these two gears 100 and 31 is identical.

More definitively, the means 20 for interconnecting the rotatable second driver gear 310 to the rotatable first driver gear 100 includes: a rotatable first shaft 21 having a first end 22A and a second end 22B, with the first driver gear 100 fixedly mounted at the first end 22A; and, a rotatable first driven gear 23 fixedly mounted at or near the second end 22B of the shaft 21, with this first driven gear 23 engaged with the second driver gear 310.

The means 50 for imparting rotary motion to the anti-backlash driven gear 31 includes: a rotatable third driver gear 51 fixedly mounted on the first shaft 21 at a location that is intermediate of the first driver gear 310 and of the first driven gear 23; a rotatable idler gear 52 that is engaged with the third driver gear 51; a rotatable second driven gear 53 that is engaged with the first idler gear 52; a rotatable second shaft 54 on which is fixedly mounted the second driven gear 53; and, means (generally designated 60) for interconnecting the second shaft 54 and the anti-backlash driven gear 31.

It is here to be noted that the rotatable second shaft 54 (of the rotary motion imparting means 50) is hollow and has a first end 55A and a second end 55B; and, that the means 40 for loading the anti-backlash driven gear 31 with a force "L" of preselected magnitude against the movable, toothed driven member 200 includes: a torsion spring shaft 41 that is disposed in the hollow second shaft 54, with the torsion spring shaft 41 having a first end 42A on which is fixedly mounted the anti-backlash driven gear 31, with this gear 31 disposed simultaneously adjacent to the first end 55A of the hollow second shaft 54, and with the torsion spring shaft 41 having a second end 42B that is positioned adjacent to the second end 55B of the hollow second shaft 54; and a means (generally designated 70) for twisting the torsion spring shaft 41 and, thereby, loading the anti-backlash driven gear 31 with the force "L" of preselected magnitude against the movable, toothed driven gear 200, with this twisting means 70 disposed at the second end 42B of the torsion spring shaft 41.

The hollow second shaft 54 has a transverse extension 56 at the second end 55B; and, the twisting means 70 includes: a transverse extension 71 at the second end 42B of the torsion spring shaft 41, with a threaded opening 72 in the extension 71, and a member 73 that is threaded complementarily with the threaded opening 72, and that is disposed in and is threadedly connected to, the threaded opening 72. The member 73 initially is screwed down through the threaded opening 72 until its end abuts, and is in contact with, the extension 56.

It is here to be noted that the twisting means 70 also may comprise, as it does in this situation, the means 60 for interconnecting the rotatable (hollow) second shaft 54 and the rotatable anti-backlash driven gear 31. It is here emphasized that the gear 31 is not connected to the first end 55A of the shaft 54.

Also, as a matter of preference and not of limitation, the first driver gear 310 is a pinion, the first driven gear 23 is a Spiroid gear, and the anti-backlash driven gear 31 is a pinion.

Additionally, the first driven gear 23, the third driver gear 51, the first driver gear 100 and the first shaft 21 may be (but need not be) integrated to form a one-piece unit. Similarly, the second driven gear 53 and the second shaft 54 may be (but need not be) integrated to form a one-piece unit, and the second shaft 54 (and, if integrated, then also the second driven gear 53) support(s) the anti-backlash driven gear 31.

Further, in the interest of better orienting the reader, the direction of rotation of all rotatable components is shown individually by an appropriately placed directional arrow.

MANNER OF OPERATION OF THE PERFERRED EMBODIMENT

The manner of operation of the preferred embodiment 10 can be easily ascertained by any person of ordinary skill in the art from the foregoing description, coupled with reference to the contents of the drawing.

To others, the following simplified explanation is given, assuming that the movable, toothed driven member 200 is to be driven in the direction indicated by the arrow (i.e., to the reader's right), but that this directional movement may be reversed (i.e., to the reader's left), if necessary (e.g., for back tracking):

After the first driver gear 100 and the anti-backlash driven gear 31 are meshed with (i.e., engaged with) the movable, toothed driven member 200, the anti-backlash driven gear 31 is loaded with a force "L" of preselected magnitude against movable, toothed driven member 200 by moving threaded member 73, that already is in contact with extension 56 of shaft 54, farther into the threaded opening 72, and "harder" against the extension 56, so that the torsion spring shaft 41 is twisted and further twisted, such that anti-backlash driven gear 31 is tightly engaged with movable, toothed driven member 200. This adjustment action also keeps constant the distance that is along the movable, toothed driven gear 200, and that is between anti-backlash driven gear 31 and first driver gear 100.

Then, as desired or as needed, the drive motor 300 is activated (i.e., "energized" in this situation) by closing the switch 410. As a result, the second driver gear 310 rotates as indicated and, in turn, rotates the first driven gear 23 (which is a Spiroid gear). This driven gear 23 rotates the first shaft 21 which, in turn, rotates the first driver gear 100 which, in turn, moves the movable, toothed driven member 200. When the desired position of driven member 200 is attained, the motor 300 is turned off by opening switch 410.

It is to be noted that when first shaft 21 is rotated, the shaft 21 also rotates the third driver gear 51 which, in turn, drives the idler gear 52 which, in turn, drives the second driven gear 53 which, in turn, rotates the hollow second shaft 54. Since the first end 55A of the second shaft 54 is not connected to anti-backlash driven gear 31, this gear 31 is not directly rotated by second shaft 54. Rather, the extension 56 of the second shaft 54 rotates, and since the threaded member 73 extends through the opening 72 in extension 71 of torsion spring shaft 41, and also abuts (and is in contact with) the extension 56 of hollow second shaft 54, the torsion spring shaft 41 is twisted until the force "L" is overcome. Then, the anti-backlash driven gear 31 rotates. It is here to be noted that the geometry of torsion spring shaft 41 and of hollow second shaft 54 do not interfere with each other.

If there is a sudden stop of the drive 10 in whole, or in part (such as in reversing for back tracking), then the backlash which would occur between movable, toothed driven member 200 and first driver gear 100, is prevented by the force-loaded anti-backlash driven gear 31 which is in tight engagement with movable, toothed driven member 200.

CONCLUSION

It is abundantly clear from all of the foregoing, and from the contents of the drawing, that the stated desired principal object of my invention, as well as other related objects of my invention, have been achieved.

It is to be noted that, although there have been described and shown the fundamental and unique features of my invention as applied to a preferred embodiment thereof, various other embodiments, variations, adaptations, substitutions, additions, omissions, and the like may occur to, and can be made by, those of ordinary skill in the art, without departing from the spirit of the invention.

What is claimed is:

1. An anti-backlash gear drive, adapted for use with a gear train which includes a rotatable first driver gear, a movable, toothed driven member engaged with said rotatable first driver gear, and a source of rotary motion driving power to which is connected a rotatable second driver gear, wherein said source of rotary motion driving power can be electively activated and, when activated, rotates said second driver gear, comprising:

a. means for interconnecting said rotatable second driver gear to said rotatable first driver gear, whereby when said rotatable second driver gear is rotated by said source of rotary motion driving power, then said rotatable first driver gear is rotated in a preselected direction and at a preselected speed, and thereby said first driver gear moves said movable, toothed driven member with which said first driver gear is engaged, wherein this means includes:
   (1) a rotatable first shaft having a first and a second end, with said rotatable first driver gear mounted at said first end thereof;
   (2) and, a rotatable first driven gear fixedly mounted on said second end of said rotatable first shaft, with said rotatable first driven gear engaged with said rotatable second driver gear;

b. means for preventing backlash between said rotatable first driver gear and said movable, toothed driven member, wherein this backlash preventing means includes:
   (1) a rotatable anti-backlash driven gear that is engaged with said movable, tooth driven member, wherein said anti-backlash driven gear and said rotatable first driver gear have a ratio of 1-to-1 and are rotatable in the same direction;
   (2) and, means for loading said rotatable anti-backlash driver gear with a force of preselected magnitude against said movable, tooth driven manner, wherein this force-loading means is operatively associated with said rotatable anti-backlash driven gear; and c. means for imparting rotary motion to said force-loaded anti-backlash driven gear, with said imparted rotary motion being in the same direction and at the same speed at which said rotatable first driver gear is being driven, and wherein this rotary motion imparting means is operatively associated with said force-loaded anti-backlash driver gear; and also wherein this means includes:
   (1) a rotatable third driver gear fixedly mounted on said rotatable first shaft at a location intermediate of said rotatable first driver gear and of said rotatable first driven gear;
   (2) a rotatable idler gear engaged with said rotatable third driver gear;
   (3) a rotatable second driver gear engaged with said rotatable idler gear;
   (4) a rotatable second shaft on which is fixedly mounted said rotatable second driven gear; and
   (5) means for interconnecting said rotatable second shaft and said rotatable anti-backlash driven gear;

whereby when said second driver gear is rotated by said source of rotary motion driving power, then said first driven gear, said first shaft, said third driver gear, said first driver gear, said second driven gear, said second shaft, said means for interconnecting said rotatable second shaft and said rotatable anti-backlash driven gear, and said anti-backlash driven gear all rotate in the same direction; and whereby said force-loaded rotating anti-backlash driven gear rotates in the same direction and at the same speed as said rotating first driver gear, and thereby said force-loaded anti-backlash driven gear prevents backlash between said first driver gear and said movable, toothed driven member with which said first driver gear is engaged.

2. An anti-backlash gear drive, as set forth in claim 1, wherein said rotatable second shaft of said rotary motion imparting means is hollow and has a first end and a second end, and wherein said means for loading said rotatable anti-backlash driven gear with a force of preselected magnitude against said movable, toothed driven member includes:

a. a torsion spring shaft disposed in said hollow second shaft, with said torsion spring shaft having a first end on which is fixedly mounted said anti-backlash driven gear, and with said anti-backlash driven gear disposed adjacent said first end of said hollow second shaft, and also with said torsion spring shaft having a second end adjacent said second end of said hollow second shaft; and, b. means for twisting said torsion spring shaft and, thereby, loading said anti-backlash driven gear with a force of preselected magnitude against said movable, toothed driven gear, wherein this twisting means is disposed at said second end of said torsion spring shaft.

3. An anti-backlash gear drive, as set forth in claim 2, wherein said rotatable hollow second shaft has a transverse extension at said second end thereof, and wherein said twisting means, of said means for loading said rotatable anti-backlash driven gear with a force of preselected magnitude against said movable, toothed driven member, includes:

a. a transverse extension at said second end of said torsion spring shaft, wherein this extension has a threaded opening therein; and, b. a member, threaded complementarily with said threaded opening, and threadedly connected to and disposed in and through said threaded opening, wherein said threaded member abuts said transverse extension of said rotatable hollow shaft;

whereby, as said threaded member is moved farther through said threaded opening, said torsion spring shaft is twisted and is further twisted, thereby loading said anti-backlash driven gear with said force of preselected magnitude against said movable, toothed drive member.

4. An anti-backlash gear drive, as set forth in claim 3, wherein said twisting means also comprises said means for interconnecting said rotatable second shaft and said rotatable anti-backlash driven gear.

5. An anti-backlash gear drive, as set forth in claim 4, wherein:
a. said first driver gear is a pinion;
b. said first driven gear is a Spiroid gear; and,
c. said anti-backlash driven gear is a pinion.

6. An anti-backlash gear drive, as set forth in claim 5, wherein said source of rotary motion driving power is an electric motor.

7. An anti-backlash gear drive, as set forth in claim 6, wherein said first driven gear, said third driver gear, and said first shaft are integrated and form a one-piece unit.

8. An anti-backlash gear drive, as set forth in claim 7, wherein said second driven gear and said second shaft are integrated and form a one-piece unit.

* * * * *